United States Patent
Müller et al.

(10) Patent No.: US 6,884,287 B2
(45) Date of Patent: Apr. 26, 2005

(54) INK BASE FOR PIGMENTED INKS, INKS MANUFACTURED THEREFROM AND THEIR USE

(75) Inventors: Anke Müller, Creussen (DE); Manuela Geis, Nürnberg (DE); Stefan Engel, Nürnberg (DE)

(73) Assignee: J.S. Staedtler GmbH & Co., Nürnberg (DE)

( * ) Notice: Subject to any disclaimer, the term of this patent is extended or adjusted under 35 U.S.C. 154(b) by 0 days.

(21) Appl. No.: 10/717,060

(22) Filed: Nov. 19, 2003

(65) Prior Publication Data

US 2004/0099179 A1 May 27, 2004

(30) Foreign Application Priority Data

Nov. 22, 2002 (DE) .......................... 102 54 486

(51) Int. Cl.⁷ ............................................... C09D 11/00
(52) U.S. Cl. ............................... 106/31.75; 106/31.86; 106/31.43; 106/31.58
(58) Field of Search ......................... 106/31.75, 31.86, 106/31.43, 31.58

(56) References Cited

U.S. PATENT DOCUMENTS

| 5,696,182 | A | * | 12/1997 | Kashiwazaki et al. ...... 523/161 |
| 6,004,389 | A | * | 12/1999 | Yatake .................... 106/31.86 |
| 6,379,443 | B1 | | 4/2002 | Komatsu et al. |
| 6,454,846 | B1 | * | 9/2002 | Yatake .................... 106/31.58 |
| 6,695,900 | B1 | * | 2/2004 | Momose ................. 106/31.75 |

FOREIGN PATENT DOCUMENTS

| DE | 3539727 | 5/1986 |
| DE | 199 16 532 A1 | 10/2000 |

\* cited by examiner

*Primary Examiner*—Mark L. Bell
*Assistant Examiner*—Veronica F. Faison
(74) *Attorney, Agent, or Firm*—Friedrich Kueffner

(57) ABSTRACT

An ink base for producing pigmented inks having a water base contains a drying retarder and a pH adjusting agent. The drying retarder contains at least diethylene glycol, 1,6-hexane diol, and pentaerythritol. The pH adjusting agent (PH) contains at least one amine. The ink base contains at least 30.0–95.5% by wt. diethylene glycol; 3.0–40.0% by wt. 1,6-hexane diol; 0.01–3.0% by wt. pentaerythritol; and 1.5–15.0% by wt. amine(s).

10 Claims, No Drawings

INK BASE FOR PIGMENTED INKS, INKS MANUFACTURED THEREFROM AND THEIR USE

BACKGROUND OF THE INVENTION

1. Field of the Invention

The invention relates to an ink base for pigmented inks, inks made therefrom, as well as their use for printing, in particular, for use in ink-jet systems or other machine-based writing, printing, drawing or marking methods.

2. Description of the Related Art

Pigmented inks having a water-base and their use for inkjet printers are known in principle. Such inks according to the prior art are comprised of water, pigments as color-providing agents, drying retarders, and optionally other additives such as, for example, polymers, emulsifiers, preservatives, and surfactants. Drying retarders in inks according to the prior art, inter alia, are often, for example, glycols, glycerin, and pyrrolidones as well as mixtures of these drying retarders.

In the following table, some examples of drying retarders used in such pigmented inks as well as their proportion in the ink in weight % (% by wt.) are listed.

| Ink | Drying Retarder |
| --- | --- |
| yellow ink | 3.1% ethylene glycol |
|  | 1.2% diethylene glycol |
|  | 3.9% 2-pyrrolidone |
|  | 10.1% glycerine |
|  | 6.8% butyl triglycol |
| red ink (magenta) | 11.2% ethylene glycol |
|  | 3.1% 2-pyrrolidone |
|  | 26.7% glycerine |
|  | 6.7% butyl triglycol |
| blue ink (cyan) | 7.8% ethylene glycol |
|  | 2.0% 2-pyrrolidone |
|  | 12.0% glycerine |
|  | 12.8% butyl triglycol |
| black ink | 0.2% 1,2-propane diol |
|  | 0.3% diethylene glycol |
|  | 2.1% 2-pyrrolidone |
|  | 11.1% glycerine |
|  | 4.3% triethylene glycol |
|  | 13.6% butyl diglycol |

A disadvantage of such ink compositions is that such pigmented inks have a tendency to dry within the printing jets, to a substantially higher degree in comparison to, for example, the dye-based inks. Because of this, reliability cannot be ensured due to plugged and dried-up jets; this is manifested preliminarily already by an unsatisfactory printing quality. For this reason, it has been attempted to compensate this disadvantage by increasing the proportion of the drying retarder; however, this, in turn, also leads to disadvantages. In particular in the case of fast printers and when using inexpensive printing media in combination with inks having a high contents of drying retarders, this results in unsatisfactory contour sharpness and surface coverage. As a result of the increased drying time, the probability of smudging during printing and during removal from the printer is extremely high.

Moreover, the manufacturing costs of such inks according to the prior art are very high.

SUMMARY OF THE INVENTION

It is an object of the present invention to provide an ink base for pigmented inks, in particular, pigmented inks for inkjet printing, which ink base does not have the aforementioned disadvantages and, in particular, does not have the tendency of drying on the jets but still enables short drying times on the printing medium, provides a qualitatively excellent printing image, in particular, high contour sharpness and uniform surfaces. The term uniform surfaces is to be understood in that the inks should spread easily but should not bleed at the color contours. When using the ink base according to the invention as well as the inks manufactured therefrom, a high printing reliability should be ensured. Moreover, the ink base as well as the inks should be producible inexpensively and should be usable as universally as possible on all printing media and in connection with different printers and printing systems.

In accordance with the present invention, this is achieved in that:

the drying retarder is comprised at least of diethylene glycol (DR1), 1,6-hexane diol (DR2), and pentaerythritol (DR3);

the ink base comprises at least

| | |
| --- | --- |
| diethylene glycol (DR1) | 30.0–95.5% by wt. |
| 1,6-hexane diol (DR2) | 3.0–40.0% by wt. |
| pentaerythritol (DR3) and | 0.01–3.0% by wt. |
| amine (s) (PH) | 1.5–15.0% by wt.; | and the pH adjusting agent (PH) is an amine or a mixture of several amines.

The invention is furthermore solved in that the ink is comprised of:

| | |
| --- | --- |
| 20.0–95.0% by wt. | water (bidistilled) (SOL), |
| 0.1–40.0% by wt. | pigment preparation (COA), |
| 0.1–10.0% by wt. | triethanolamine (PH), |
| 0.01–2.0% by wt. | pentaerythritol (DR3), |
| 0.5–10.0% by wt. | 1,6-hexane diol (DR2), |
| 0.2–30.0% by wt. | diethylene glycol (DR1), |
| 0–20.0% by wt. | polymer dispersion (BM), |
| 0.01–0.5% by wt. | preservative (PS), |
| 0–2.0% by wt. | surfactant (SF), and |
| 0–30.0% by wt. | additional drying retarders (ADR). |

It was found to be particularly advantageous that, when employing the ink according to the present invention and the inks manufactured therefrom, drying of ink on the jets of the print heads can be reliably prevented but, on the other hand, the drying time, even for fast printers, on almost any print medium is so short that smudging in the printer or during removal from the printer can be reliably prevented.

With minimal device-specific modifications, the ink base according to the invention can be used universally in different printers so that costs in regard to development, production, storage, and logistics can be saved.

The object is solved in that an ink base for pigmented inks has been found which is comprised of a special combination of drying retarders (DR) and amines (PH).

The drying retarders (DR) according to the invention are a combination of diethylene glycol (DR1), 1,6-hexane diol (DR2), and pentaerythritol (DR3). These drying retarders are water-soluble and non-toxic substances.

Additional drying retarders (ADR) can be added in addition to the inventively employed drying retarders (DR).

The ink base according to the invention furthermore comprises amines for adjusting the pH value. By means of the amines (PH), the ink base and the inks produced therefrom become basic so that, additionally, the wear on the print head is minimized and the service life of the ink conduit system is increased.

Moreover, it was found that the ink base and the inks produced therefrom have a substantially improved storage stability within the basic pH range.

Examples of amines (PH) are ethanol amine, triethanolamine, ammonia, and dimethyl ethanolamine as well as mixtures of the aforementioned amines (PH).

By means of the claimed combination, comprised of special drying retarders (DR) and at least one amine (PH), the initial writing behavior after extended printer downtimes is significantly improved. Not only after printer downtimes but also during the printing process, when individual colors are not required or used during a certain printing duration, a significant improvement in the initial printing behavior is observed.

DESCRIPTION OF THE PREFERRED EMBODIMENTS

For explaining the invention in more detail, the following boundary example of an ink base is provided:

| DR1 | diethylene glycol | 30.0–95.5% by wt. |
|---|---|---|
| DR2 | 1,6-hexane diol | 3.0–40.0% by wt. |
| DR3 | pentaerythritol | 0.01–3.0% by wt. |
| PH | amines | 1.5–15.0% by wt. |

A compositional example for an ink base according to the invention is as follows:

| diethylene glycol | 74.40% by wt. |
|---|---|
| 1,6-hexane diol | 20.70% by wt. |
| pentaerythritol | 0.03% by wt. |
| amines | 4.97% by wt. |

The amines (PH) used in the ink base can be described by the general formula N(R1 R2 R3), wherein the free radicals R1, R2, R3, independent from one another, can be hydrogen (H), a dimethyl group ($CH_2$) or an ethyl group ($CH_2CH_2OH$).

In the following, in order to provide further explanations, a boundary example as well as several specific ink compositions are listed which are made by employing the ink base according to the invention.

BOUNDARY EXAMPLE

Inks for Inkjet Printing

| water (bidistilled) | SOL | 20.0–95.0% by wt. |
|---|---|---|
| pigment preparation | COA | 0.1–40.0% by wt. |
| triethanolamine | PH | 0.1–10.0% by wt. |
| pentaerythritol | DR3 | 0.01–2.0% by wt. |
| 1,6-hexane diol | DR2 | 0.5–10.0% by wt. |
| diethylene glycol | DR1 | 0.2–30.0% by wt. |
| polymer dispersion | BM | 0–20.0% by wt. |
| preservative | PS | 0.01–0.5% by wt. |
| surfactant | SF | 0–2.0% by wt. |
| addit. drying retarders | ADR | 0–30.0% by wt. |

Compositional Example 1

| water (bidistilled) | SOL | 62.1% by wt. |
|---|---|---|
| pigment preparation | COA | 11.5% by wt. |
| triethanolamine | PH | 0.8% by wt. |
| pentaerythritol | DR3 | 0.05% by wt. |
| 1,6-hexane diol | DR2 | 3.35% by wt. |
| diethylene glycol | DR1 | 12.0% by wt. |
| acrylate dispersion | BM | 2.0% by wt. |
| butyl diglycol | ADR | 8.0% by wt. |
| preservative | PS | 0.2% by wt. |

Compositional Example 2

| water (bidistilled) | SOL | 53.1% by wt. |
|---|---|---|
| pigment preparation | COA | 25.0% by wt. |
| triethanolamine | PH | 0.8% by wt. |
| pentaerythritol | DR3 | 0.01% by wt. |
| 1,6-hexane diol | DR2 | 0.67% by wt. |
| diethylene glycol | DR1 | 20.2% by wt. |
| urethane dispersion | BM | 2.0% by wt. |
| isothiazolinone derivatives | PS | 0.15% by wt. |

Compositional Example 3

| water (deionized) | SOL | 68.8% by wt. |
|---|---|---|
| pigment preparation | COA | 9.0% by wt. |
| triethanolamine | PH | 1.0% by wt. |
| pentaerythritol | DR3 | 0.01% by wt. |
| 1,6-hexane diol | DR2 | 0.67% by wt. |
| diethylene glycol | DR1 | 20.2% by wt. |
| preservative | PS | 0.2% by wt. |
| surfactant | SF | 0.1% by wt. |

Compositional Example 4

Blue Ink

| water (bidistilled) | SOL | 76.1% by wt. |
|---|---|---|
| pigment preparation | COA | 1.8% by wt. |
| triethanolamine | PH | 1.0% by wt. |
| pentaerythritol | DR3 | 0.02% by wt. |
| 1,6-hexane diol | DR2 | 0.67% by wt. |
| diethylene glycol | DR1 | 20.2% by wt. |
| preservative | PS | 0.15% by wt. |
| fatty acid alcohol polyglycol ether | SF | 0.1% by wt. |

The ink base and the inks produced therefrom can optionally contain additional additives or auxiliary agents. Polymers (BM) in dissolved or dispersed form can be contained as additives. Examples of such polymers (BM) are for example acrylate and urethane.

Additional conventional additives that are optionally contained in the inks according to the invention are, for example, surfactants (SF), preservatives (PS), emulsifiers, and spreading agents.

As coloring (color-providing) agents (COA) pigments or pigment preparations are used that are essentially salt-free. There are no limits in regard to employing pigments.

A cost reduction when producing ready-for-use inks can be achieved in that the proportion of cost-intensive chemicals such as drying retarders (DR) is kept as small as possible without this reducing the ink quality or negatively affecting the solution to the object of the invention.

Preservatives (PS) can be added already to the ink base, if needed. Examples of preservatives (PS) are solutions of isothiazolinone derivative, O-acetales and N-acetales, halogenated acid amide derivatives and/or N-heterocyclic, S-heterocyclic compounds.

The inventive ink base or the inks produced therefrom are used for printing, in particular, for printing with inkjet systems or other machine-based writing, printing, drawing or marking methods. The inks are comprised substantially of the ink base, coloring agents (COA), and water (SOL) as well as optionally other additives.

While specific embodiments of the invention have been shown and described in detail to illustrate the inventive principles, it will be understood that the invention may be embodied otherwise without departing from such principles.

What is claimed is:

1. An ink base for producing pigmented inks having a water base, the ink base comprising:

a drying retarder and a pH adjusting agent;

wherein the drying retarder comprises at least diethylene glycol (DR1), 1,6-hexane diol (DR2), and pentaerythritol (DR3);

wherein the pH adjusting agent (PH) comprises at least one amine;

wherein the ink base comprises at least

| | |
|---|---|
| diethylene glycol (DR1) | 30.0–95.5% by wt. |
| 1,6-hexane diol (DR2) | 3.0–40.0% by wt. |
| pentaerythritol (DR3) | 0.01–3.0% by wt. and |
| amine (PH) | 1.5–15.0% by wt. |

2. The ink base according to claim 1, wherein the at least one amine has the formula N(R1 R2 R3), wherein R1, R2, and R3, independent from one another, are hydrogen (H), a dimethyl group ($CH_2$) or an ethyl group ($CH_2CH_2OH$).

3. The ink base according to claim 1, further comprising at least one additional drying retarder (ADR) selected from the group consisting of glycols, pyrrolidones, and glycerin.

4. The ink base according to claim 1, further comprising a salt-free coloring agent.

5. The ink base according claim 4, wherein the coloring agent is a pigment or a pigment preparation.

6. The ink base according to claim 1, further comprising at least one of surfactants, preservatives, and emulsifiers.

7. An ink comprising:

an ink base according to claim 1;

coloring agents; and water.

8. The ink according to claim 7, further comprising surfactants, preservatives, and emulsifiers.

9. The ink according to claim 8, comprising:

| | |
|---|---|
| 20.0–95.0% by wt. | water (bidistilled) (SOL), |
| 0.1–40.0% by wt. | pigment preparation (COA), |
| 0.1–10.0% by wt. | triethanolamine (PH), |
| 0.01–2.0% by wt. | pentaerythritol (DR3), |
| 0.5–10.0% by wt. | 1,6-hexane diol (DR2), |
| 0.2–30.0% by wt. | diethylene glycol (DR1), |
| 0–20.0% by wt. | polymer dispersion (BM), |
| 0.01–0.5% by wt. | preservative (PS), |
| 0–2.0% by wt. | surfactant (SF), and |
| 0–30.0% by wt. | additional drying retarders (ADR). |

10. The ink according to claim 7 for inkjet printing or machine-based writing, printing, drawing or marking.

\* \* \* \* \*